(12) United States Patent
Pravetz (10) Patent No.: US 7,730,297 B1
(45) Date of Patent: Jun. 1, 2010

(54) AUTOMATED PUBLIC KEY CERTIFICATE TRANSFER

(75) Inventor: James D. Pravetz, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1110 days.

(21) Appl. No.: 10/072,260

(22) Filed: Feb. 6, 2002

(51) Int. Cl.
*H04L 29/06* (2006.01)
(52) U.S. Cl. .................. 713/152; 713/156; 726/10
(58) Field of Classification Search ............... 713/152, 713/156; 726/10
See application file for complete search history.

(56) References Cited

U.S. PATENT DOCUMENTS

| | | | |
|---|---|---|---|
| 5,572,643 A | 11/1996 | Judson | |
| 5,809,512 A | 9/1998 | Kato | |
| 5,838,906 A | 11/1998 | Doyle et al. | |
| 6,014,688 A * | 1/2000 | Venkatraman et al. | 709/206 |
| 6,052,732 A | 4/2000 | Gosling | |
| 6,078,951 A * | 6/2000 | Pashupathy et al. | 709/217 |
| 6,230,189 B1 | 5/2001 | Sato et al. | |
| 6,324,645 B1 * | 11/2001 | Andrews et al. | 713/157 |
| 6,397,246 B1 | 5/2002 | Wolfe | |
| 6,542,472 B1 | 4/2003 | Onuma | |
| 6,651,084 B1 | 11/2003 | Kelley et al. | |
| 6,760,752 B1 * | 7/2004 | Liu et al. | 709/206 |
| 6,766,305 B1 | 7/2004 | Fucarile et al. | |
| 7,234,114 B2 | 6/2007 | Kurtz et al. | |
| 7,293,099 B1 | 11/2007 | Kalajan | |
| 2002/0010746 A1 | 1/2002 | Jilk et al. | |
| 2002/0124167 A1 * | 9/2002 | Toyota et al. | 713/150 |
| 2003/0028768 A1 * | 2/2003 | Leon et al. | 713/169 |
| 2004/0243837 A1 * | 12/2004 | Fredette et al. | 713/201 |

OTHER PUBLICATIONS

Stallings, William, Cryptography and Network Security 2nd ed, 1998, Prentice Hall, pp. 450-455.*
Schneier, Bruce, Applied Cryptography 2nd ed, 1996, John Wiley & Sons, pp. 577-583.*
Dusse et al, S/MIME Version 2 Certificate Handling, RFC 2312, Mar. 1998, <URL:http://www.ietf.org/rfc/rfc2312.txt> retrieved online Jul. 31, 2006, pp. 1-19.*
"Adding Certificates to your WAB", Eric D. Miller, 1997-1999, 2 pages.
"Downloading Digital IDs", Eric D. Miller, 1997-1999, 1 page.
"FDF Toolkit Overview and Reference" Technical Note #5194, Version: Acrobat 5.0, Adobe Systems Incorporated, Sep. 2001, pp. 3-13.

(Continued)

*Primary Examiner*—Christopher J Brown
(74) *Attorney, Agent, or Firm*—Fish & Richardson P.C.

(57) ABSTRACT

Methods and apparatus, including computer program products, implementing and using techniques for exchanging certificates, including generating a first container object including one or more of a sender's certificate and a request for a recipient's certificate, wherein the first container object has a recognizable container type, and transmitting the first container object to a recipient's address. Upon receipt of the first container object, it can be determined the first container object includes one or more of a certificate and a request for a certificate of the recipient. A request for a certificate can be responded to by generating a second container object including a certificate of the recipient, extracting a return address from the first container object, and transmitting the second container object to the return address.

45 Claims, 6 Drawing Sheets

OTHER PUBLICATIONS

"Forms Data Format" PDF 1.3 Reference Manual, Adobe Systems, Inc., Mar. 11, 1999, pp. 485-494.

"PDF Reference, Second Edition; Adobe Portable Document Format Version 1.3", Adobe Systems Incorporated, Jul. 2000 pp. 460-468.

"PGP Corporate Desktop for Windows", PGP Corporation, 2002, pp. 1-4.

"PGP Desktop Security 7.0", Network Associates, Inc., 2000, pp. 1-3.

"PGP Mail for Windows", PGP Corporation, 2002, pp. 1-3.

"PGP Technology Specifications", PGP Corporation, 2002, pp. 1-2.

"PKCS #7: Cryptographic Message Syntax Standard", RSA Laboratories, Nov. 1, 1993, 30 pages.

S. Dusse, et al. "S/MIME Version 2 Message Specification", Mar. 1998, 37 pages.

"What's New in PGP Desktop Security Version 7.1", Networks Associates Technology, Inc., 1990-2001, pp. 1-4.

"WinZip Internet Browser Support Add-On", http://www.winzip.com/ibrowser.htm, 3 pages.

Adobe Acrobat Forms System "Implementation Notes", 1998, 6 pages.

Bienz, et al. "PDF Reference Manual Version 1.2", Adobe Systems Incorporated, Nov. 27, 1996, pp. 129-130, 369, 373-376.

"Adobe Acrobat® 5.0 Help", Adobe Systems Incorporated, Released Apr. 9, 2001, pp. 142, 160-161, 163, 167-171, 205-206.

C. Adams, et al. "Internet X.509 Public Key Infrastructure Certificate Management Protocols", The Internet Society, 1999, 72 pages.

WinZip Internet Browser Support Add-On, [retrieved on Nov. 29, 2006]. Retrieved from the Internet: <URL: http://web.archive.org/web/20001209134700/winzip.com/ibrowser.htm>m 3 pages.

* cited by examiner

AUTOMATED PUBLIC KEY CERTIFICATE TRANSFER

BACKGROUND OF THE INVENTION

The present invention relates to automated public key certificate transfer.

Public key cryptography uses public-private key pairs for electronic signatures, electronic signature verification and encryption and decryption of data for security during electronic transmission. In simple terms, a public key owned by an individual receiving the data (the "recipient") is used by a sender to encrypt the data. The recipient then uses the recipient's corresponding private key to decrypt the data. In order to encrypt the data, the sender must have access to the recipient's public key.

When electronically signing data, a sender signs the data using the sender's private key, an operation that can involve using the private key to encrypt a "cryptographic hash" of the data that is being signed, and then making available to the recipient the signed data and the encrypted hash (the "signature"). The recipient verifies the signature by computing a new hash over the data using the sender's public key, decrypting the encrypted hash of the signature and comparing the two hashes. If the hashes match, then the data integrity is proven.

Typically, a public key for another individual (the sender for example) is obtained by obtaining the individual's public key certificate directly or indirectly from that individual. A certificate is an electronic data object including a public key, and can be issued by a trusted third party, a certificate authority, that verifies the identity of the certificate holder. The certificate can also include the name of the certificate authority and the name of the individual or entity for whom the certificate is issued. The recipient of another individual's certificate should take steps to verify the trustworthiness or authenticity of the certificate, which can then be added to a personal certificate database for later use. The recipient of an electronically signed document can verify the identity of the sender (signer) by verifying the certificate of the sender.

Currently, there are a number of ways to obtain someone's certificate, some of which are covered by standards issued by the Internet Engineering Task Force public-key infrastructure (X.509) working group (IETF-PKIX). For instance, the certificate can be found in a searchable database on a server. Such a server would typically be provided and managed by a trusted party that undertakes to ensure the validity of the database's contents, including the certificates it contains.

A certificate owner can also manually include the certificate as an attachment to an e-mail message sent to a recipient. This requires the owner to place the certificate into a file that will be attached to the e-mail message, and the recipient must manually add the certificate to a personal certificate database for later use.

SUMMARY

The present invention provides methods and apparatus, including computer program products, for exchanging certificates. In general, in one aspect, the invention features generating a first container object including one or more of a sender's certificate and a request for a recipient's certificate, wherein the first container object has a recognizable container type, and transmitting the first container object to a recipient's address.

Implementations of the invention can include one or more of the following. Prior to generating a first container object, input can be received from a sender specifying the recipient's address and specifying one or more of a certificate of the sender and a request for the recipient's certificate to include in the first container object. The first container object can be transmitted by electronic mail or Hypertext Transfer Protocol, and the first container object can be generated by a server. If the sender has multiple certificates, input can be received from the sender selecting one or more of the sender's multiple certificates, which selected certificates can be retrieved from a certificate database and included in the first container object. If the first container object includes a request for a recipient's certificate, input can be received from a sender specifying a return address for receiving the recipient's certificate and instructions for returning the recipient's certificate, and the return address and instructions for returning the recipient's certificate can be included in the first container object. If the first container object includes a sender's certificate, validation information to be used to validate the sender's certificate can be included in the first container object. The container type can be Forms Data Format.

In general, in another aspect, the invention features receiving a container object having a container type, recognizing the container type and that the container object may include a certificate of a sender of the container object, and determining if the container object contains a certificate of the sender.

Implementations of the invention can include one or more of the following. The container object can be received by electronic mail or Hypertext Transfer Protocol. The container type can be Forms Data Format. The container object can include a certificate and validation information and the certificate can be accepted or rejected using the validation information. If the certificate is accepted, the certificate can be extracted and stored.

In general, in another aspect, the invention features receiving a first container object having a container type, recognize the container type and that the first container object may include a request for a certificate of a recipient of the container object, determining if the first container object includes a request for a certificate of the recipient, and, if a request is included in the first container object, then responding to the request. A request can be responded to by generating a second container object including a certificate of the recipient, extracting a return address from the first container object, and transmitting the second container object to the return address. The first container object and the second container object can be a Forms Data Format container type. The first container object can be received from a networked server and can be responded to by transmitting the recipient's certificate back to the networked server by Hypertext Transfer Protocol.

In general, in another aspect, the invention features generating a first container object including a sender's certificate and a request for a recipient's certificate, wherein the first container object has a recognizable container type, transmitting the first container object to a recipient's address, and receiving a second container object generated in response to the request for the recipient's certificate, the second container object having the recognizable container type. It can be determined if the second container object includes the recipient's certificate and, if the second container object includes the recipient's certificate, then the recipient's certificate can be accepted or rejected.

In general, in another aspect, the invention features generating a first container object including one or more of instructions for retrieving a sender's certificate and instructions requesting a recipient's certificate, wherein the first container object has a recognizable container type, and transmitting the first container object to a recipient's address.

The invention can be implemented to realize one or more of the following advantages. A user can request a certificate from another user. The recipient of such a request can respond to the request by sending the recipient's certificate automatically, without the recipient manually exporting the certificate into a file or cutting and pasting the certificate into an e-mail message. A user can send a certificate over a computer network without having to export manually the certificate into a file or cut and paste the certificate into an e-mail message. The certificate transfer process can take place across multiple network elements of different kinds. A server can request a certificate from a specific user. A server can push certificates over a communications network to a user.

The details of one or more implementations of the invention are set forth in the accompanying drawings and the description below. Other features and advantages of the invention will become apparent from the description, the drawings, and the claims.

BRIEF DESCRIPTION OF DRAWINGS

Like reference symbols in the various drawings indicate like elements.

DETAILED DESCRIPTION

Figure 1A:
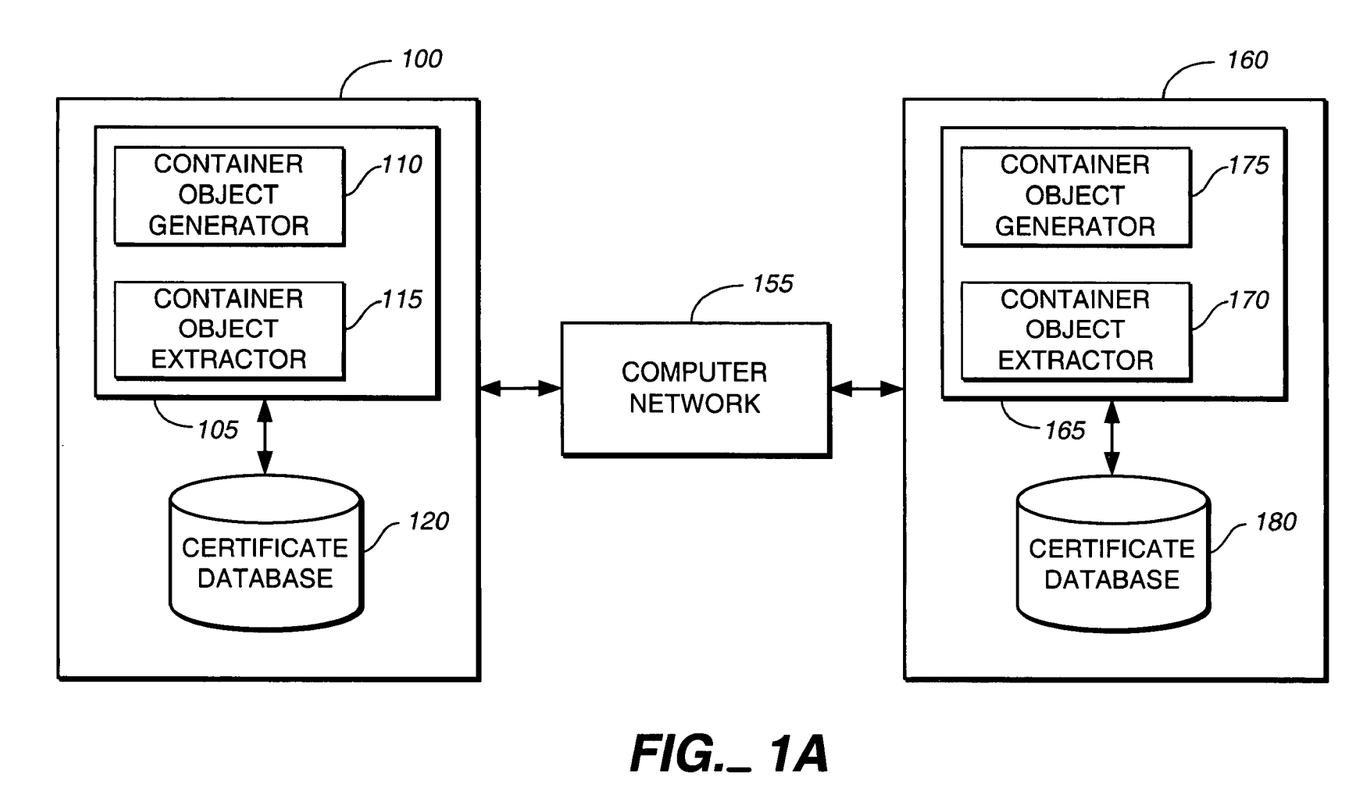
FIG. 1A is a block diagram of a system for exchanging certificates.

As shown in FIG. 1A, a system for exchanging certificates includes computers 100, 160 that communicate over a computer network 155. The computers 100, 160 each have a computer program 105, 165 that includes a container object generator module 110, 175 and a container object extractor module 115, 170. The computer programs 105, 165 have access to a data store storing certificate information. In the illustrative system, this is a certificate database 120, 180 stored on storage media locally connected to the respective computer 100, 160. The certificate database 120, 180 includes certificates of a user of the computer 100, 160 and certificates the user has obtained from others. Any convenient form of database including a simple text file, and any convenient form of storage can be used, including, for example, a remote database stored on a server.

Figure 1B:
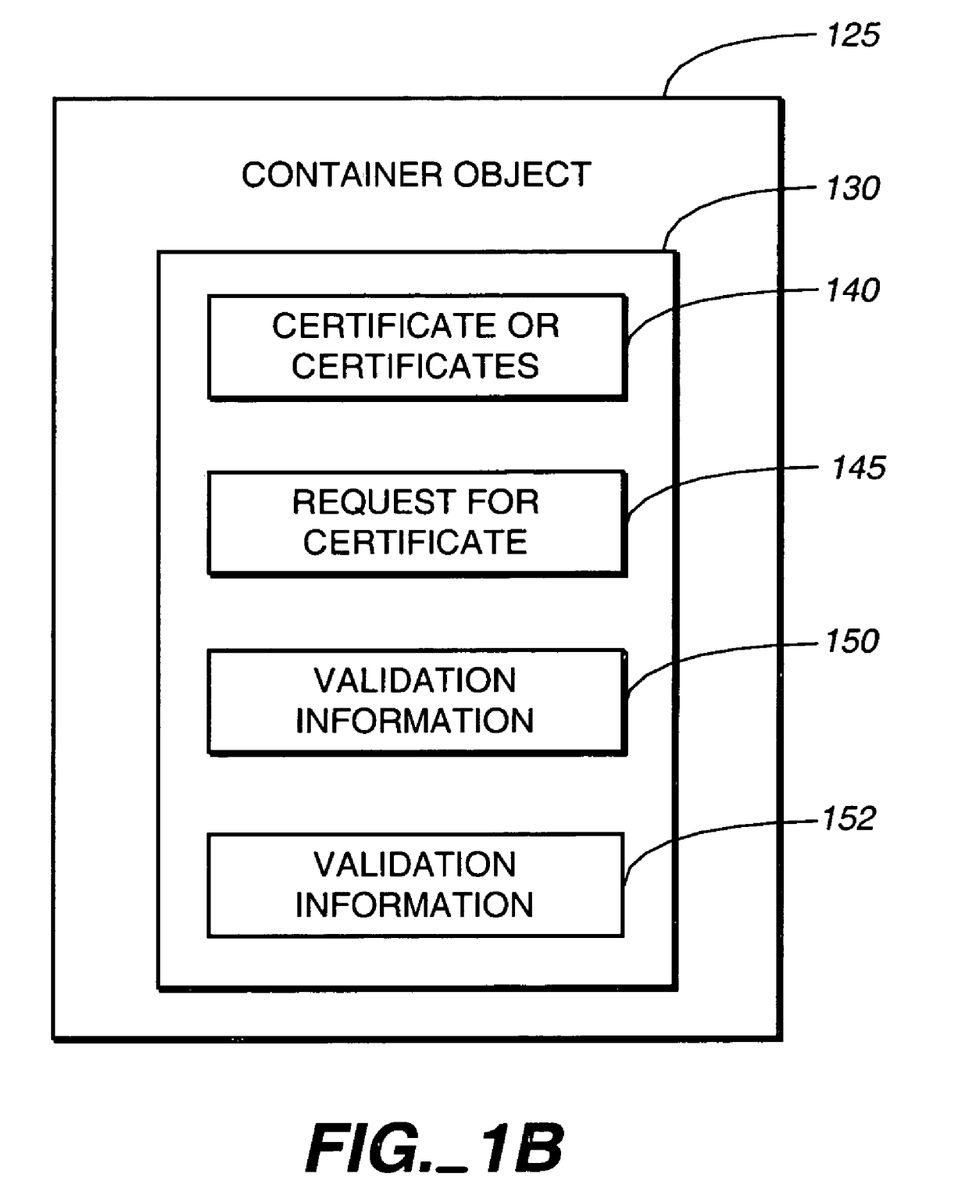
FIG. 1B is a block diagram of a container object.

The container object generator 110, 175 operates to create container objects 125, shown in FIG. 1B. A container object 125 includes data 130. This data 130 can include some or all of: a certificate or certificates 140; a request for a certificate 145; a return address 150; and validation information 152. Container objects 125 are generated to be transmitted to another computer.

Figure 2:
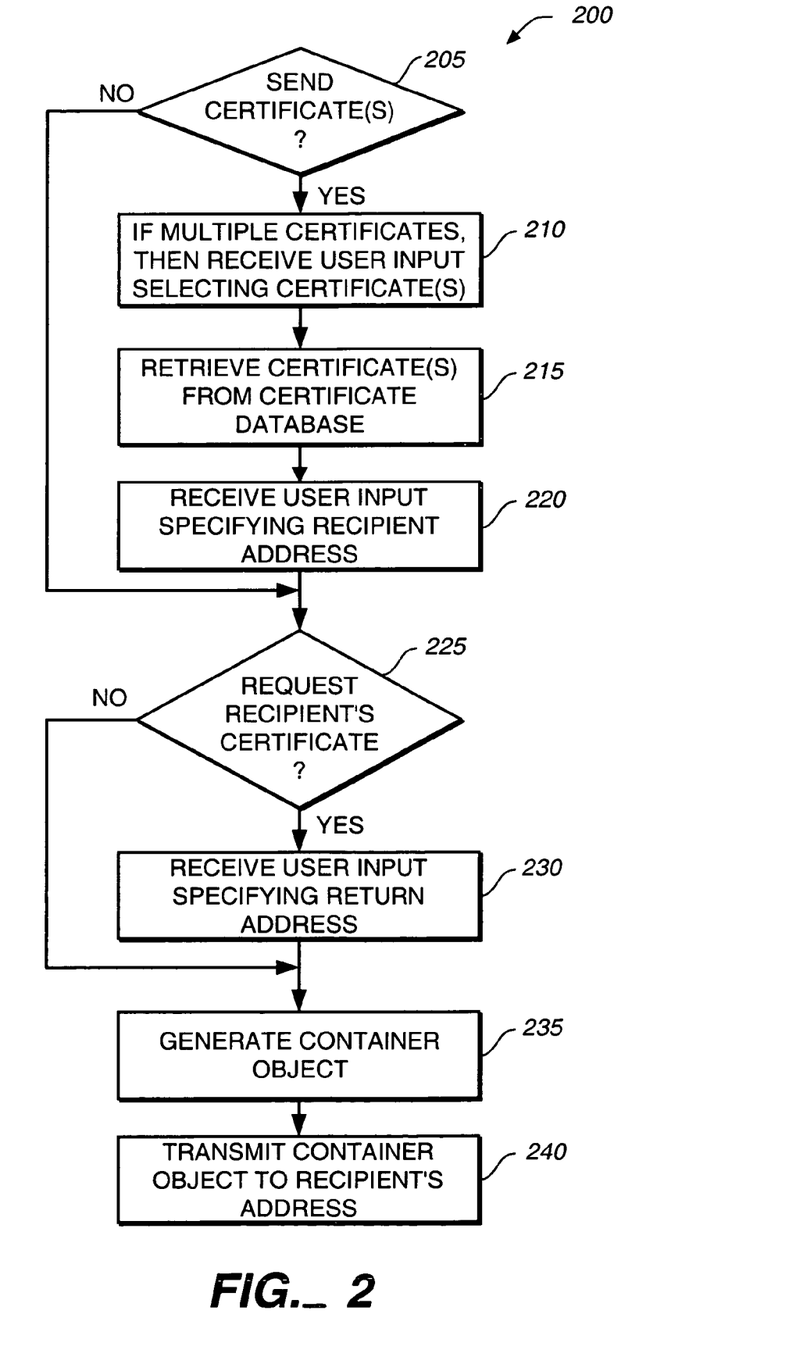
FIG. 2 is a flowchart showing a method for sending a certificate and request for a certificate.

A computer program running in a computer, such as computer program 105, can implement a method 200 for transmitting a sender's certificate, a request for a recipient's certificate, or both, as shown in FIG. 2. A sender can have multiple certificates. For example, a sender can have different certificates for different purposes, such as a certificate for electronically signing a document and a certificate for encryption. Further, a sender can have different sets of certificates for use with different recipients. For example, a sender can have a set of certificates for use with the sender's bank and a second set of certificates for use with the sender's brokerage house. If a sender selects to send a certificate ('yes' branch of decision step 205) and the sender has multiple certificates, then the sender is prompted to select the certificate or certificates to send (210), which certificate or certificates are retrieved from a data store, such as certificate database 120 (215). If the sender does not have multiple certificates, then the sender's certificate is automatically retrieved from the certificate database 120 (215). The sender is also prompted to input an address for the recipient of the sender's certificate or certificates (220).

The computer program 105 also determines whether the sender desires to request a certificate of the recipient (225). This can be done by receiving input from the sender or by referring to a previously set user preference. For example, a preference can indicate that a certificate should be requested, if a certificate of the recipient does not appear in the sender's certificate database. Optionally, computer program 105 can prompt the sender to specify a return address to which the recipient's certificate is to be delivered (230), or alternatively, a default or previously set address can be used. The sender can also provide instructions for returning the recipient's certificate, such as specifying a protocol. A return address can be any convenient return path for the recipient's certificate, so long as the protocol is specified, the address is specified for that protocol and the protocol supports this type of operation. For example, the return address can be an e-mail address or a URL. The container object generator module 110 of the computer program 105 then generates a container object including the sender's certificate or certificates (if the sender selected to include a certificate), the sender's request for the recipient's certificate (if any), and the return address (if any) (235). The container object is then transmitted to the recipient's address (240).

Figure 3:
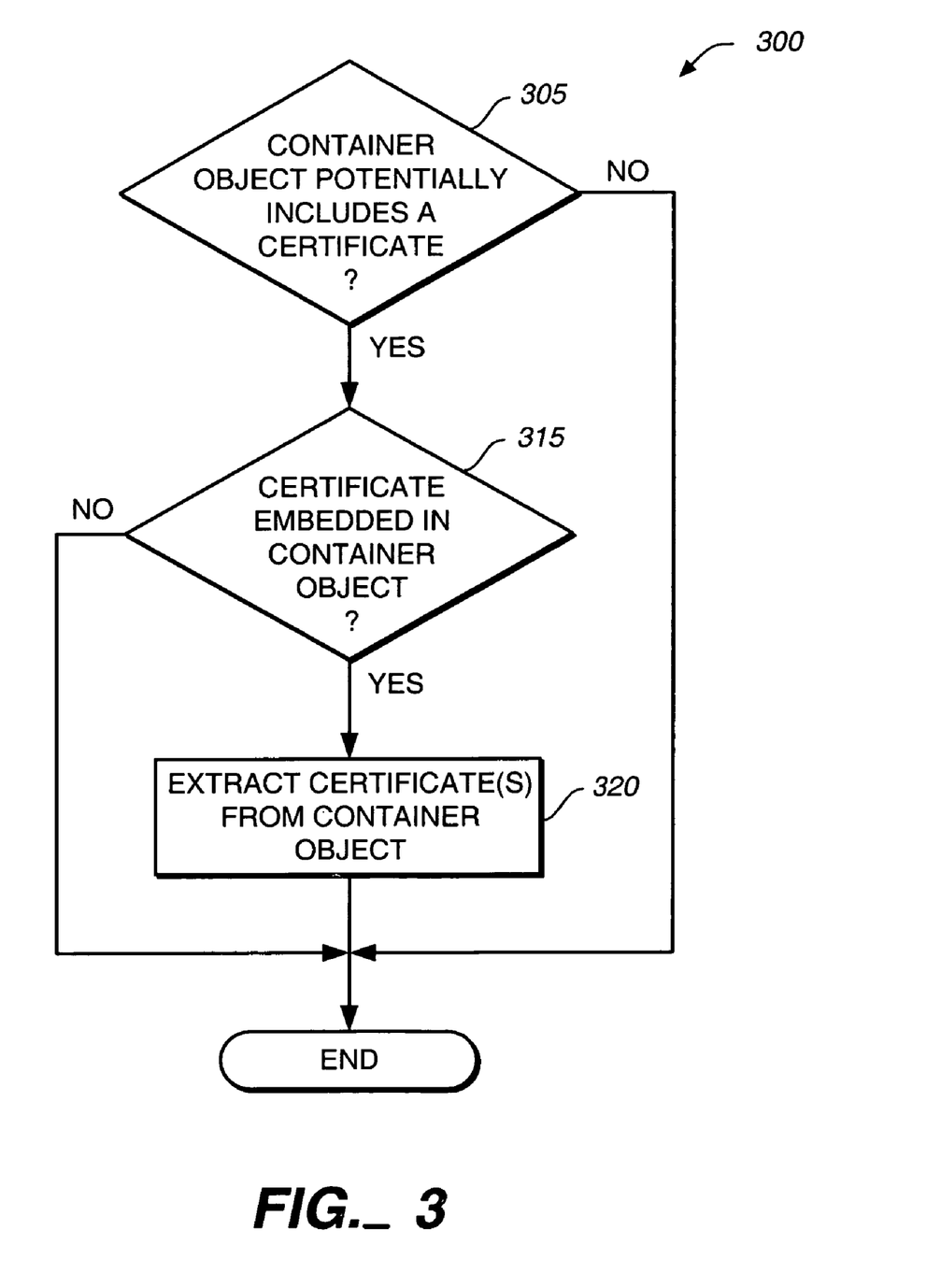
FIG. 3 is a flowchart showing a method for receiving a certificate.

FIG. 3 shows a method 300 for receiving a container object including a sender's certificate. Recipient's computer 160 receives the container object and recognizes the container object as one that potentially includes a certificate ('yes' branch of decision step 310), based on the container type of the container object. The computer program 160 determines if a certificate is embedded in the container object (315) and, if so, the container object extractor 170 extracts the certificate from the container object (320). The extracted certificate can be stored in the certificate database 180.

Figure 4:
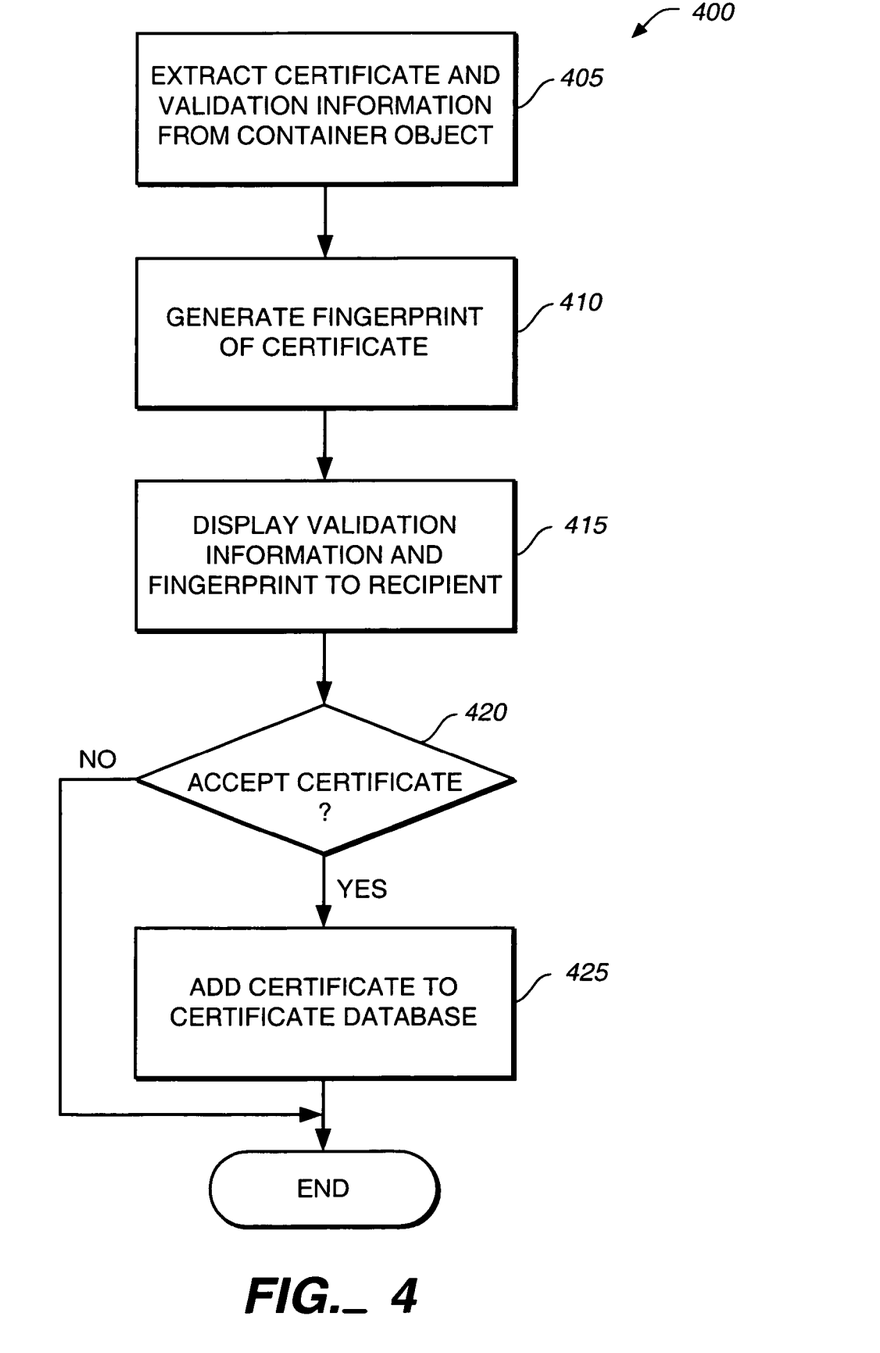
FIG. 4 is a flowchart showing a method for validating a certificate.

As shown in FIG. 4, the recipient of the sender's certificate should validate the certificate before adding the certificate to the recipient's certificate database 180. For example, the container object can include validation information 152 that can be used to verify the authenticity (trustworthiness) of the sender's certificate before accepting the sender's certificate, which validation information 152 can be extracted from the container object by the container object extractor 170 (405). Upon receipt of the sender's certificate, the computer program 165 can generate a fingerprint of the certificate (410). A fingerprint is a cryptographic function, e.g., a one-way hash function, of the bytes of the certificate. The validation information 152 and the generated fingerprint can be displayed to the recipient (415). The validation information included in the container object can be contact information for the sender, which the recipient can use to contact the sender to confirm that the generated fingerprint of the received certificate matches a fingerprint of the certificate generated by the sender's computer 100 using computer program 105. If the fingerprints match, then the authenticity is verified and the recipient can accept the certificate ('yes' branch of decision step 420) and computer program 165 can add the certificate to the certificate database 180 (425). If the fingerprints do not match, then verification fails, and the certificate should be rejected and not added to the certificate database 180 ('no' branch of decision step 420).

In another implementation, the validation information 152 can include contact information of a third party authority that can verify the authenticity of the sender's certificate received by the recipient. For example, the contact information can be a URL to a Web site where the recipient can validate the sender's certificate through a trusted third party, such as a certificate registry. Any other convenient means to validate the sender's certificate can be used.

Figure 5:
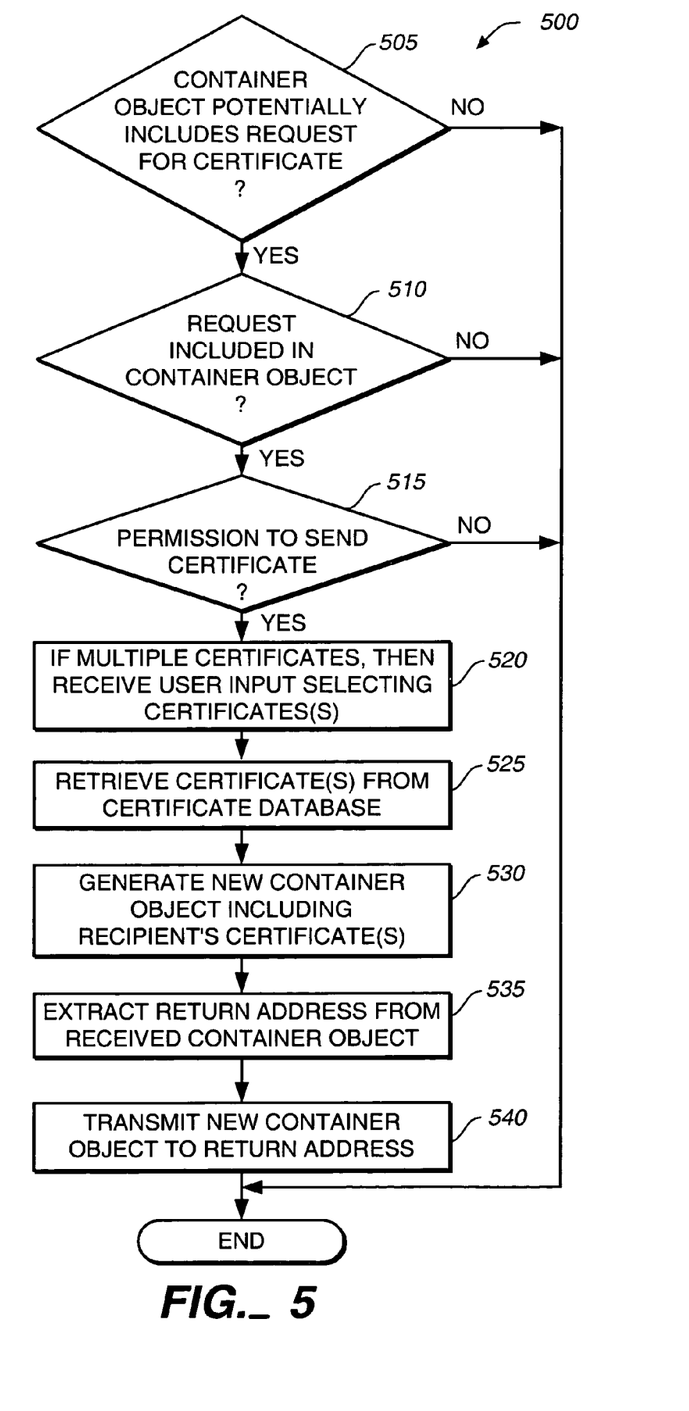
FIG. 5 is a flowchart showing a method for receiving and responding to a request for a certificate.

FIG. 5 shows a method 500 for receiving and responding to a request for the recipient's certificate. Recipient's computer 160 receives and recognizes the container object as one that could potentially include a request for a certificate ('yes' branch of decision step 505) based on the container type of the container object. If the container object includes a request for the recipient's certificate ('yes' branch of decision step 510), the user can optionally be prompted to specify whether permission is granted to send a certificate of the recipient in response to the request (515). If permission is granted ('yes' branch of decision step 515), then if the recipient has more than one certificate, the recipient is optionally prompted to select the certificate or certificates to send in response to the request (520), which certificates are retrieved from certificate database 180 (525). As discussed above, the recipient could have different certificates for use with different parties, such as a bank or a brokerage house. The request for a certificate can be tailored to assist the recipient in selecting the appropriate certificate or certificates to send in response to the request. If the recipient has only one certificate, then the certificate is automatically retrieved from certificate database 180 (525).

Container object generator 175 generates a new container object including the recipient's certificate or certificates (530). A return address to which the certificate is to be delivered is extracted from the received container object (535). The new container object is transmitted to the return address (540).

In another implementation, a server generates a container object including a request for a certificate. For example, a Web server can generate a container object including a request for a certificate and a recipient's Web browser can execute computer program 105, 165 to process the container object. The request for a certificate can be processed as described above in reference to FIG. 5. Alternatively, the request for a certificate can specify a particular network protocol for a direct response that contains the recipient's certificate. The computer program 165 could, for example, transmit the recipient's certificate back to the Web server using Hypertext Transfer Protocol.

For illustrative purposes, the following example describes an instance when a Web server is the sender of a request for a certificate. A bank providing online banking services allows the bank's customers to receive their banking statements electronically over HTTP from a Web server. For security purposes, the bank requires a customer's public key certificate to encrypt the customer's banking statements before transmitting them to the customer electronically. Accordingly, if the bank does not have a customer's certificate in a certificate database, the bank generates a container object including a request for a certificate. A customer's Web browser associates the container object with an application program, such as computer program 105, 165, to process the container object and respond to the request for a certificate included in the container object.

In another implementation, certificates can be downloaded from a server. For example, a company having a number of employees could maintain a certificate database containing the certificates of the employees on a Web server. Employees of the company could access a Web site and request certificates of their fellow employees to enable the employees to share encrypted documents. Upon receiving a request by an employee for a certificate, the Web server generates a container object including the certificate. The employee's Web browser associates the container object with computer program 105, 165 and processes the container object using the method 300 shown in FIG. 3.

In one implementation, the container object is a Forms Data Format (FDF) file, which is described in "PDF Reference", $2^{nd}$ ed., Addison-Wesley Publishing Company, (2000) at pp. 460-468. The FDF file type provides a convenient tunneling protocol for passing data between users using e-mail, HTTP, or other network protocols. A Web browser of an operating system of a computer 100, 160 will generally be instructed to associate an application computer program 105, 165, for example, Adobe Acrobat™ 5.0 ("Acrobat") by Adobe Systems Incorporated of San Jose, Calif., with the FDF file type or Multipurpose Internet Mail Extensions (MIME) type. The Web browser or operating system checks whether Acrobat is open, opens Acrobat if it is not open, and sends the FDF file to Acrobat for processing.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are programmed on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. The computer program 105, 165 is not limited to Adobe Acroba™5.0. Also, computer program 105, 165 need not be a standalone program, but can be a plug-in installed in conjunction with another program. Similarly, a container object format different from the FDF file format can be used as the container object 125 and the new container object. Further, one or both of the computers 100, 160 can be one or more server or servers. Accordingly, the return address 150 may be any network address using any network protocol, in addition to HTTP server addresses and e-mail addresses.

Accordingly, other embodiments are within the scope of the following claims.

What is claimed is:

1. A computer program product, tangibly stored on a machine-readable medium, comprising a first application's instructions to perform operations on a client comprising:
   generating a first container object, the first container object having a recognizable container type that is associated with the first application, the first container object containing a sender's certificate or a request for a recipient's certificate, and where generating the first container object includes putting the certificate or request in the container object;
   using a second application on the client distinct from the first application to transmit the first container object to a recipient's address, wherein the second application is an e-mail client application or a Web browser application;
   automatically obtaining a second container object from the second application, the second container object having been received by the second application and the second container object having the same recognizable container type as the first container object; and
   automatically identifying and extracting one or more certificates from within the second container object.

2. The computer program product of claim 1, further comprising the first application's instructions to perform operations comprising:
   prior to generating a first container object, receiving input from a sender specifying the recipient's address and specifying one or more of a certificate of the sender and a request for the recipient's certificate to include in the first container object.

3. The computer program product of claim 1, wherein transmitting the first container object includes transmitting the first container object by one of electronic mail and Hypertext Transfer Protocol.

4. The computer program product of claim 1, wherein the first container object is generated by a server.

5. The computer program product of claim 1, further comprising the first application's instructions to perform operations comprising:
   determining whether the sender has multiple certificates;
   if the sender has multiple certificates, receiving input from the sender selecting one or more of the sender's multiple certificates;
   retrieving the sender's selected certificates from a certificate database; and
   including the sender's selected certificates in the first container object.

6. The computer program product of claim 1, wherein the first container object includes a request for a recipient's certificate, further comprising the first application's instructions to perform operations comprising:
   receiving input from a sender specifying a return address for receiving the recipient's certificate and instructions for returning the recipient's certificate; and
   including in the first container object the return address and instructions for returning the recipient's certificate.

7. The computer program product of claim 1, wherein the first container object includes a sender's certificate, and further comprising the first application's instructions to perform operations comprising:
   including in the first container object validation information to be used to validate the sender's certificate.

8. The computer program product of claim 1, wherein the container type is Forms Data Format.

9. A computer program product, tangibly stored on a machine-readable medium, for a client machine which associates a first application with a MIME container type, so that subsequent to a second application on the client distinct from the first application receiving a container object having the MIME container type, it is recognized that the container type is associated with the first application, comprising the first application's instructions to perform operations on the client comprising:
   automatically obtaining the container object from the second application, wherein the second application is an e-mail client application or a Web browser application;
   recognizing that the container object may include a certificate of a sender of the container object; and
   automatically determining if the container object contains a certificate of the sender.

10. The computer program product of claim 9, wherein the MIME container type is Forms Data Format.

11. The computer program product of claim 9, wherein the container object includes a certificate and validation information, and further comprising the first application's instructions to perform operations comprising:
   accepting or rejecting the certificate using the validation information; and
   if the certificate is accepted, extracting the certificate and storing the certificate.

12. A computer program product, tangibly stored on a machine-readable medium, for a machine which associates a first application with a MIME container type, so that subsequent to a second application distinct from the first application receiving a container object having the MIME container type, it is recognized that the MIME container type is associated with the first application, wherein the second application is an e-mail client application or a Web browser application, the computer program product comprising the first application's instructions to perform operations comprising:
   automatically obtaining a first container object from the second application;
   recognizing that the first container object may include a request for a certificate of a recipient of the container object;
   automatically determining if the first container object includes a request for a certificate of the recipient; and
   if a request is included in the first container object, then responding to the request.

13. The computer program product of claim 12, further comprising the first application's instructions to perform operations comprising:

generating a second container object of the same MIME container type including a certificate of the recipient;
extracting a return address from the first container object; and
using the second application to transmit the second container object to the return address.

14. The computer program product of claim 13, wherein the certificate of the recipient is stored in a certificate database, and further comprising the first application's instructions to perform operations comprising:
determining whether the recipient has multiple certificates;
if the recipient has multiple certificates, receiving input from the recipient selecting one or more of the recipient's multiple certificates;
retrieving the selected certificates from the certificate database; and
including the selected certificates in the second container object.

15. The computer program product of claim 13, further comprising the first application's instructions to perform operations comprising:
including in the second container object validation information to be used to validate the certificate of the recipient.

16. The computer program product of claim 13, wherein the first container object and the second container object are a Forms Data Format container type.

17. The computer program product of claim 12, wherein the first container object is received from a networked server and further comprising the first application's instructions to perform operations comprising:
transmitting the recipient's certificate back to the networked server by Hypertext Transfer Protocol.

18. The computer program product of claim 12, wherein the container type is Forms Data Format container type.

19. The computer program product of claim 1, wherein the first container object contains both a sender's certificate and a request for a recipient's certificate.

20. The computer program product of claim 19, further comprising the first application's instructions to perform operations comprising:
prior to generating a first container object, receiving input from a sender specifying the recipient's address and specifying one or more of a certificate of the sender and a request for the recipient's certificate to include in the first container object.

21. The computer program product of claim 19, further comprising the first application's instructions to perform operations comprising:
determining whether the sender has multiple certificates;
if the sender has multiple certificates, receiving input from the sender selecting one or more of the sender's multiple certificates;
including instructions for retrieving the sender's selected certificates in the first container object.

22. The computer program product of claim 19, wherein the first container object includes instructions requesting a recipient's certificate, further comprising the first application's instructions to perform operations comprising:
receiving input from a sender specifying a return address for receiving the recipient's certificate and instructions for returning the recipient's certificate; and
including in the first container object the return address and instructions for returning the recipient's certificate.

23. The computer program product of claim 19, wherein the first container object includes a sender's certificate, further comprising the first application's instructions to perform operations comprising:
including in the first container object instructions for validating the sender's certificate.

24. The computer program product of claim 19, wherein the container type is Forms Data Format.

25. A computer-implemented method, comprising:
generating, using a first application on a client, a first container object, wherein the first container object has a recognizable container type that is associated with the first application, the first container object containing a sender's certificate or a request for a recipient's certificate, and where generating the first container object includes putting the certificate or request in the container object;
transmitting, using a second application on the client which is distinct from the first application, the first container object to a recipient's address, wherein the second application is an e-mail client application or a Web browser application;
receiving, using the second application, a second container object, wherein the second container object has the same recognizable container type;
automatically recognizing, using the second application, that the container type is associated with the first application; and
invoking, using one or more processors, the first application, the first application automatically identifying and extracting one or more certificates from within the second container object.

26. The method of claim 25, further comprising:
prior to generating a first container object, receiving input, using the first application, from a sender specifying the recipient's address and specifying one or more of a certificate of the sender and a request for the recipient's certificate to include in the first container object.

27. The method of claim 25, wherein the first container object is generated by a server.

28. The method of claim 25, further comprising,
determining, using the first application, whether the sender has multiple certificates;
if the sender has multiple certificates, then receiving input, using the first application, from the sender selecting one or more of the sender's multiple certificates;
retrieving, using the first application, the sender's selected certificates from a certificate database; and
including, using the first application, the sender's selected certificates in the first container object.

29. The method of claim 25, wherein the first container object includes a request for a recipient's certificate, the method further comprising:
receiving input, at the first application, from a sender specifying a return address for receiving the recipient's certificate and instructions for returning the recipient's certificate; and
including in the first container object the return address and instructions for returning the recipient's certificate.

30. The method of claim 25, wherein the first container object includes a sender's certificate, the method further comprising:
including, using the first application, in the first container object validation information to be used to validate the sender's certificate.

31. The method of claim 25, wherein the container type is Forms Data Format.

32. A computer-implemented method for receiving a certificate, the method comprising:

receiving, using a second application on a client, a container object, the container object having a recognizable container type that is associated with a first application on the client which is distinct from the second application, wherein the second application is an e-mail client application or a Web browser application;

automatically recognizing, using, one or more processors and the second application, that the container type is associated with the first application;

recognizing, using the first application, that the container object may include a certificate of a sender of the container object; and automatically determining, using the first application, if the container object contains a certificate of the sender.

33. The method of claim 32, wherein receiving a container object comprises receiving a message including the container object by at least one of the following: electronic mail or Hypertext Transfer Protocol.

34. The method of claim 32, wherein the container type is Forms Data Format.

35. The method of claim 32, wherein the container object includes a certificate and validation information, the method further comprising:

accepting or rejecting, using the first application, the certificate using the validation information; and if accepting the certificate, then extracting, using the first application, the certificate and storing the certificate.

36. A computer-implemented method for receiving a request for a certificate, the method comprising:

receiving, using a second application, a first container object, the first container object having a recognizable container type that is associated with a first application which is distinct from the second application, wherein the second application is an e-mail client application or a Web browser application;

automatically recognizing, using one or more processors and the second application, the container type as associated with the first application recognizing, using the first application, that the first container object may include a request for a certificate of a recipient of the container object;

automatically determining, using the first application, if the first container object includes a request for a certificate of the recipient; and if a request is included in the first container object, then responding, using the first application, to the request.

37. The method of claim 36, wherein responding to the request further comprises:

generating, using the first application, a second container object including a certificate of the recipient;

extracting, using the first application, a return address from the first container object; and transmitting, using the second application, the second container object to the return address.

38. The method of claim 37, wherein transmitting the second container object includes transmitting by one of electronic mail and Hypertext Transfer Protocol.

39. The method of claim 37, wherein the certificate of the recipient is stored in a certificate database, the method further comprising, determining, using the first application, whether the recipient has multiple certificates;

if the recipient has multiple certificates, then receiving input, using the first application, from the recipient selecting one or more of the recipient's multiple certificates;

retrieving, using the first application, the selected certificates from the certificate database; and including, using the first application, the selected certificates in the second container object.

40. The method of claim 37, further comprising:

including, using the first application, in the second container object validation information to be used to validate the certificate of the recipient.

41. The method of claim 37, wherein the first container object and the second container object are a Forms Data Format container type.

42. The method of claim 36, wherein the first container object is received from a networked server and wherein responding to the request further comprises:

transmitting, using the second application, the recipient's certificate back to the networked server by Hypertext Transfer Protocol.

43. The method of claim 36, wherein the container type is Forms Data Format container type.

44. A system, comprising:

one or more processors configured to invoke instances of one or more applications;

a first instance of a first application operable to generate a first container object, the first container object having a recognizable container type that is associated with the first application, the first container object containing a sender's certificate or a request for a recipient's certificate, and where generating the first container object includes putting the certificate or request in the container object;

a first instance of a second application operable to transmit the first container object to a recipient's address, the second application being distinct from the first application, wherein the second application is an e-mail client application or a Web browser application;

a second instance of the second application operable to receive the first container object and to automatically recognize the container type as associated with the first application; and a second instance of the first application operable to:

automatically recognize that the first container object may include a request for a certificate of a recipient of the container object;

automatically determine if the first container object includes the certificate of the sender, and if so, then automatically identify and extract one or more certificates from within the first container object; and automatically determine if the first container object includes the request for the certificate of the recipient, and if so, then respond to the request, generating a second container object of the same recognizable container type including the certificate of the recipient, and using the second instance of the second application to transmit the second container object to an address of the sender.

45. The system of claim 44, wherein:

the container type is Forms Data Format;

the first application is operable to generate Forms Data Format containers and the second application is an e-mail client application;

the system includes a first computer and a second computer operating in communication with the first computer over the Internet;

the first instance of the first application is installed on the first computer;

the first instance of the e-mail client application is installed on the first computer;

the second instance of the first application is installed on the second computer; and the second instance of the e-mail client application is installed on the second computer.

* * * * *